United States Patent [19]

Fejes et al.

[11] Patent Number: 4,786,527
[45] Date of Patent: Nov. 22, 1988

[54] METHOD OF APPLYING A LAYER OF ION-EXCHANGE RESIN TO A SUPPORT MATRIX, PERMEABLE TO LIQUID, IN A FILTER ELEMENT

[75] Inventors: Peter Fejes, Västeras; Eva Sundell, Hägersten, both of Sweden

[73] Assignee: AB ASEA-Atom, Västerås, Sweden

[21] Appl. No.: 42,251

[22] Filed: Apr. 24, 1987

[30] Foreign Application Priority Data

Apr. 28, 1986 [SE] Sweden ............................... 8601956

[51] Int. Cl.$^4$ ............................................... B01D 37/02
[52] U.S. Cl. .................................... 427/244; 210/682;
210/686; 210/777; 210/193
[58] Field of Search ............... 210/777, 778, 193, 679,
210/682, 686; 366/339; 427/201, 244

[56] References Cited

U.S. PATENT DOCUMENTS 3,674,686  7/1972  Brimmer et al. ..................... 210/778
4,408,893  10/1983  Rice .................................... 366/339

*Primary Examiner*—Ivars Cintins
*Attorney, Agent, or Firm*—Watson, Cole, Grindle & Watson

[57] ABSTRACT

A layer of small-sized particles of an organic ion exchange resin is applied to a support matrix, permeable to liquid, of a filter element (7) which is arranged in a chamber (5) in an ion-exchange filter (1) for filtering of liquids containing radioactive constituents. The filter and a mixer (11), consisting of a tube with a number of stationary mixing elements arranged one after the other in the longitudinal direction of the tube, are arranged in a circulation system (10) for water. The mixing elements successively divide up a material flow, supplied at the inlet end of the mixer, into a number of sub-flows containing different parts of the original material flow and the sub-flows are reunited, before they reach the outlet end of the tube. Suspended ion-exchange resin (13a, 16a) is supplied to the inlet end (11a) of the mixer for the circulating water while the water is being circulated in the circulation system. A coating of the ion-exchange resin with predetermined and reproducible properties is obtained on each filter element.

3 Claims, 1 Drawing Sheet

METHOD OF APPLYING A LAYER OF ION-EXCHANGE RESIN TO A SUPPORT MATRIX, PERMEABLE TO LIQUID, IN A FILTER ELEMENT

BACKGROUND OF THE INVENTION

In nuclear reactor plants ionic impurities are normally removed from the water in the reactor primary circuit with the aid of ion-exchange filters containing ion-exchange resin. The impurities consist mainly of corrosion products from the construction material in the primary circuit, such as ions of or containing iron, manganese and chromium, which have become radioactive when the water containing these corrosion products has passed the reactor core. The water in the primary circuit may also contain impurities in the form of fission products of the reactor fuel which have leaked out into the water. Even water outside the primary circuit, such as water from floor drains and discharge pipes, is normally subjected to purification in filters with ion-exchange resins to remove radioactive impurities.

An ion-exchange filter of the kind stated above often comprises a chamber containing a plurality of filter elements, each one consisting of a support matrix permeable to liquid and of a layer of small-sized particles of an ion-exchange resin (precoatfilter), which layer is generated on the support matrix in the chamber. The layer of the ion-exchange resin can be applied on the support matrix by arranging the filter in a liquid circulation system and supplying a suspension of the ion-exchange resin to the liquid while the liquid is circulated in the circulation system.

When applying a layer of ion-exchange resin in an ion-exchange filter, there is normally used a mixture of powdered cation exchange resin and powdered anion exchange resin in the form of a suspension in water. Usually, the mixing of the cation exchange resin and the anion exchange resin is carried out while at the same time the suspension in the water is effected while using a tank which is provided with a rotatable agitator, for example a turbine agitator. This process is time-wasting and produces a result which is difficult or almost impossible to reproduce. The reason for this is primarily the tendency to agglomeration of particles which occurs and which is due to the great electrostatic charge of the particles. When the suspension is then supplied to circulating water in a circulation system, in which the ion-exchange filter is arranged, a dilution of the suspension takes place, which may lead to the particles of the ion-exchange resin not becoming homogeneously distributed in the diluted product and, as a consequence thereof, to the coating layer of the particles on the support matrix not being uniform. Also, if the manufacture of the suspension starts from a mixed product of the ion-exchange resin, the same difficulties exist in achieving coating layers on the support matrix having reproducible properties.

SUMMARY OF THE INVENTION

According to the present invention it has proved to be possible to solve the existing problems and to apply the layers of the ion-exchange resin in the filter so that the filter is given predetermined and reproducible properties. According to the invention, this is achieved by carrying out the final mixing of the ion-exchange resin and water, before the ion-exchange resin is used for application in the coating layers, in a special mixer which, together with the filter, is arranged in a liquid circulation system and which is formed as a tube with stationary mixing elements.

More particularly, the present invention relates to a method of applying a layer of small-sized particles of an ion-exchange resin on a support matrix, permeable to liquid, of a filter element which is arranged in an ion-exchange filter for filtering liquids containing radioactive constituents, the filter being arranged in a circulation system for water and a suspension of the ion-exchange resin being supplied to the water while the water is circulated in the circulation system, characterized in that a mixer is arranged in the circulation system consisting of a tube with a number of stationary mixing elements, which are arranged one after the other in the longitudinal direction of the tube and by means of which a material flow, supplied at the inlet end of the tube, is divided into a number of sub-flows containing different parts of the original material flow and the sub-flows are reunited into one material flow before they reach the outlet end of the tube, and that the suspended ion-exchange resin is supplied to the inlet end of the tube for the circulating water.

According to one embodiment of the invention, the mixing elements of the mixer consist of helical, band-formed elements and two consecutively positioned mixing elements are twisted in relation to each other about the axis of the tube. Preferably, two mixing elements arranged one after the other have helical forms with the opposite twist, i.e., after a mixing element with a right-hand helical form there follows a mixing element with a lefthand helical form.

According to a preferred embodiment of the invention, suspended anion exchange resin and suspended cation exchange resin are supplied separately to the inlet end of the mixer. Together with the water which is simultaneously supplied to the inlet end after having passed the mixer, this brings about a suspension with exceedingly reproducible properties. However, it is also possible to supply a mixture of suspended anion exchange resin and cation exchange resin to the inlet end of the mixer.

The organic ion-exchange resion is preferably of polymer type, whereby the anion exchanger may consist of a styrene, crosslinked with divinyl benzene, with quaternary ammonium groups, and the cation exchanger of a sulphonated polystyrene crosslinked with divinyl benzene. The particles of the ion-exchangers preferably have a mean grain size of 10–100 $\mu$m. The ion-exchange resins are preferably stored in the form of suspensions in water with a dry substance content of 5–20 per cent by weight before they are subjected to mixing or dilution with water for preparation of the product which is used when forming the layer on the support matrices of the filter elements and which is thus brought into contact with these. In the diluted product mentioned, the dry substance content preferably amounts to 100–500 ppm.

The matrix which is permeable to water may be tubular but may also have another shape. It may, for example, consist of a perforated tube of metal such as stainless steel or a porous tube of ceramic material such as aluminum oxide, or a tube of a fibrous material such as a tube of paper. The support matrix may possibly be provided with a coating on the tube or on the base with another shape of, for example, active carbon, silicon oxide, or a fibrous material such as a polymer, for example polypropylene, or cellulose in the form of short fibres or in the form of a wire winding. The support matrix has such a porosity that it permits the build-up of layers of the ion-exchange resin which provide a completely clear filtrate.

The invention will be explained in greater detail by way of example with reference to the accompanying drawings.

DETAILED DESCRIPTION OF THE PREFERRED EMBODIMENTS

Figure 1:
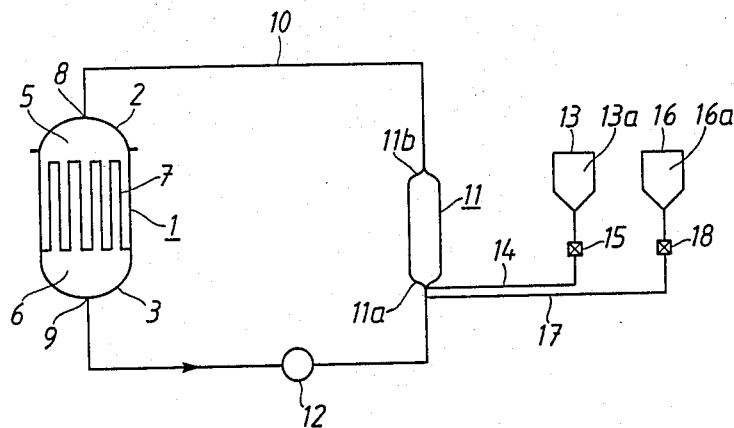
FIGS. 1 and 2 show schematic views of ion-exchange filters arranged in circulation systems comprising a mixer for carrying out the method according to the present invention.
Figure 2:
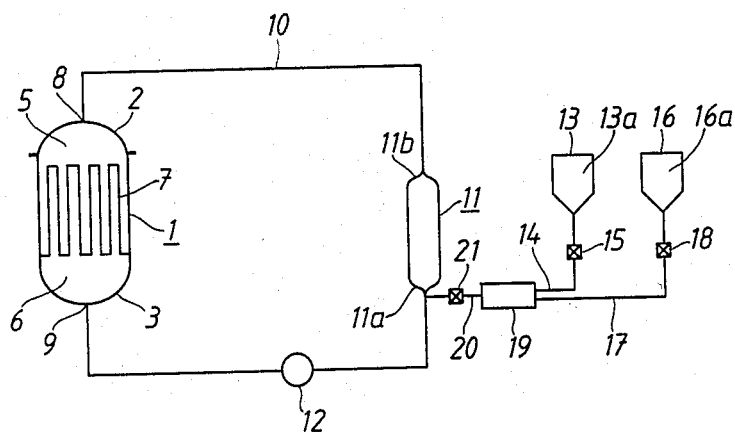

The ion-exchange filter 1 in the devices according to FIGS. 1 and 2 consists of a cylindrical pressure vessel with cupped end walls 2 and 3, the end wall 2 consisting of a detachable lid. The pressure vessel is divided into an upper chamber 5 and a lower chamber 6. The pressure vessel includes a large number of tubular filter elements 7 which are permeable to liquid, of which only four are shown in the figure. Each filter element 7 consists in the exemplified case of a perforated steel tube, the outside of which is provided with a wrapping of polypropylene fibres. The input side of the filter elements 7, for the medium to be filtered, faces the chamber 5 which in turn is provided with an inlet 8 for that medium, whereas the output side of the filter elements 7 communicates with the chamber 6 which, in turn, is provided with an outlet 9 for the medium which has passed through the walls of the filter elements 7. When applying the layers of ion-exchange resin on the filter elements 7 in accordance with FIGS. 1 and 2, the filter 1 is arranged in a circulation system 10 which, in addition, comprises a mixer 11 in the form of a tube with stationary mixing elements, which will be described in greater detail in a subsequent paragraph, as well as a pump 12 which takes care of the liquid circulation in the system 10. A vessel 13 containing cation exchange resin 13a and a vessel 16 containing anion exchange resin 16a are connected, via a conduit 14 with a valve 15 and a conduit 17 with a valve 18, respectively, to the inlet end 11a of the mixer 11 for the circulating liquid. The cation exchange resin 13a consists of sulphonated polystyrene, crosslinked with 8% divinyl benzene, the sum formula being $C_{8.16}H_{8.16}SO_3)_{0.92}$ and mole weight 180. The anion exchange resin 16b consists of a polystyrene, crosslinked with divinyl benzene, with quaternary ammonium groups, the sum formula being $C_{10.92}H_{16.44}(NO)_{0.92}$ and mole weight 175. The particles of the cation exchange resin 13a as well as the particles of the anion exchange resin 16a have a mean grain size of 35 um. The dry solids content of the suspended cation exchange resin 13a in the vessel 13 amounts to 10 per cent by weight, and the dry solids content of the suspended anion exchange resin 16a in the vessel 16 also amounts to 10 per cent by weight. The cation exchange resin 13a and the anion exchange resin 16a are supplied to the inlet end 11a of the mixer 11 in the weight proportions 2:1 and are mixed with water circulating in the system 10, so that the mixture will have a total concentration of cation and anion exchange resin of 400 ppm. The coating process is interrupted when the thickness of the coating obtained on the filter elements 7 amounts to 7 mm.

In the mode of coating illustrated in FIG. 2, the cation exchange resin 13a and the anion exchange resin 16a are mixed in a separate mixing vessel 19 before the mixture thus obtained is supplied, via the conduit 20 with the value 21, to the inlet end 11a of the mixer 11. the mixer 19 may be of the same kind as the mixer 11 but also of a different kind, such as in the form of a tank with a rotatable agitator.

Figure 3:
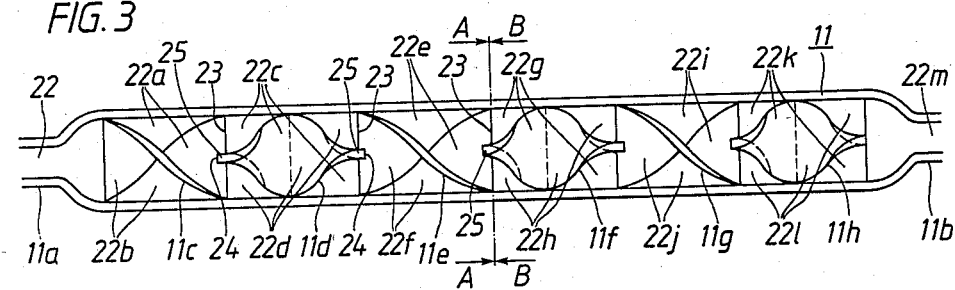
FIG. 3 shows a schematic view, on an enlarged scale, of a mixer included in the devices according to FIGS. 1 and 2, and FIGS. 4 and 5 show a cross-section through the mixer as seen from two opposite directions A and B, respectively.
Figures 4, 5:
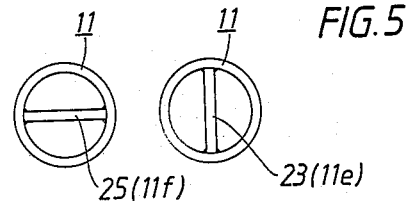

In accordance with FIGS. 3 to 5, the mixer 11 consists of a tube with the inlet end 11a and the outlet end 11b. The mixer 11 includes a number of mixing elements 11c, 11d, 11e, 11f, 11g and 11h arranged one after the other in the longitudinal direction of the tube. Each one of the mixing elements 11c–11h consists of helical, band-formed elements extending in the longitudinal direction of the tube. The elements 11c, 11e and 11g have a right-hand helical form and are mutually oriented in the same way in the tube. The elements 11d, 11b and 11h have a lefthand helical form and are mutually oriented in the same way in the tube. Thus, elements 11d, 11f and 11h have a mirror-inverted form in relation to elements 11c, 11e and 11g. Further, elements 11d, 11f and 11h are turned 90° around the axis of the tube in relation to elements 11c, 11e and 11g. All the elements extend over the entire cross-section of the tube. Confronting edges on the elements are interconnected by providing the edges 23 in elements 11c, 11e and 11g with grooves 24, into which the edges 25 on elements 11d, 11f and 11h are inserted. A material flow 22 which is supplied to the inlet 11a of the tube is divided by element 11c into two sub-flows 22a and 22b. From these sub-flows, two new sub-flows 22c and 22d are formed by element 11d. From sub-flows 22c and 22d, two new sub-flows 22e and 22f are formed by element 11e. From sub-flows 22e and 22f, two new sub-flows 22g and 22h are formed by element 11f. From sub-flows 22g and 22h, two new sub-flows 22i and 22j are formed by element 11g. From sub-flows 22i and 22j, two new sub-flows 22k and 22l are formed by element 11h. These sub-flows are reunited into a material flow 22m at the outlet 11b of the tube.

We claim:

1. A method of applying a layer of a homogeneous mixture of small-sized particles of a cation exchange resin and an anion exchange resin on a liquid-permeable support matrix of a filter element which is located in an ion-exchange filter tank, said method comprising the steps of
   (a) providing a mixer consisting of a tube having an inlet end, an outlet end and a plurality of stationary mixing elements serially positioned therein which are capable of dividing a single flow of material passing through said tube from said inlet end to said outlet end into a successive number of subflows, which then become united into a single flow at said outlet end,
   (b) circulating a flow of water through said mixer from said inlet end to said outlet end, then to and through said ion-exchange filter tank, and then back to said inlet end of said mixer, and
   (c) separately supplying cation exchange resin and anion exchange resin to said inlet end of said mixer, said cation exchange resin and said anion exchange resin being homogeneously mixed in said flow of water as it passes through said mixer and, after circulating to the ion-exchange filter tank, being deposited as a layer on the filter element therein.

2. A method according to claim 1, wherein the mixing elements in said mixer consist of helical, band-formed elements and that two consecutively arranged mixing elements are twisted in relation to each other about an axis of the tube.

3. A method according to claim 2, wherein two consecutively arranged, helical, tape-formed elements have helical forms with an opposite direction of twist.

* * * * *